US010719798B2

(12) United States Patent
Deane et al.

(10) Patent No.: US 10,719,798 B2
(45) Date of Patent: *Jul. 21, 2020

(54) SYSTEM FOR ELECTRONIC COMMUNICATION EXCHANGE

(71) Applicant: Hartford Fire Insurance Company, Hartford, CT (US)

(72) Inventors: Stephen M. Deane, West Hartford, CT (US); Peter Neag, Torrington, CT (US); Glen-Roberts Pitruzzello, Middletown, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/232,225

(22) Filed: Dec. 26, 2018

(65) Prior Publication Data

US 2019/0130335 A1 May 2, 2019

Related U.S. Application Data

(63) Continuation of application No. 14/945,901, filed on Nov. 19, 2015, now Pat. No. 10,198,705.

(51) Int. Cl.
*G06Q 10/06* (2012.01)
*G06Q 40/08* (2012.01)

(52) U.S. Cl.
CPC ....... *G06Q 10/06395* (2013.01); *G06Q 40/08* (2013.01)

(58) Field of Classification Search
CPC .. G06Q 40/00; G06Q 40/08; G06Q 10/06395; G06Q 30/016
See application file for complete search history.

(56) References Cited

U.S. PATENT DOCUMENTS

2003/0154097 A1* 8/2003 Hartley ................. G06Q 30/02
705/2

FOREIGN PATENT DOCUMENTS

EP 2139191 A1 * 12/2009 ............. H04L 65/80
WO WO-2011083422 A2 * 7/2011 ............. G06Q 10/00

OTHER PUBLICATIONS

Agarwala et al.: QMON: QoS- and Utility-Aware Monitoring in Enterprise Systems, 2006, IEEE, pp. 124-133. (Year: 2006).*

(Continued)

*Primary Examiner* — Bijendra K Shrestha
(74) *Attorney, Agent, or Firm* — Buckley, Maschoff & Talwalkar LLC

(57) ABSTRACT

According to some embodiments, a data acquisition computer may receive a first task request, including a data source communication identifier, from a back-end application. The data acquisition computer may perform a first data acquisition process and determine indications of: when the data source expects to return to a normal operating condition, a quality of service received by the data source from a service provider, and a quality of service performed by the back-end application server. The back-end application server might generate and transmit the task request, for example, a first pre-determined period of time after an event associated with the data source. The back-end application server may also detect that a second pre-determined period of time after the event has occurred and facilitate a second data acquisition process including at least one rating within a scale of ratings provided by the data source.

20 Claims, 15 Drawing Sheets

(56) References Cited

OTHER PUBLICATIONS

Al-Abri et al.: Patient Satisfaction Survey as a Tool Towards Quality Improvement, Jan. 2014, Oman Medical Journal, 29 (1), pp. 1-8. (Year: 2014).*

* cited by examiner

SYSTEM FOR ELECTRONIC COMMUNICATION EXCHANGE

CROSS-REFERENCE TO RELATED APPLICATIONS

The present application is a continuation of U.S. patent application Ser. No. 14/945,901 entitled "SYSTEM FOR ELECTRONIC COMMUNICATION EXCHANGE" and filed on Nov. 19, 2015. The entire content of that application is incorporated herein by reference.

FIELD

The present invention relates to computer systems and more particularly to computer systems that are utilized in connection with an electronic communication exchange.

BACKGROUND

In applications associated with distributed communication networks, it may be important to determine when one or more data sources expect to return to a normal operating condition. For example, a back-end application server and/or a data acquisition computer may perform a data acquisition process, using a data source communication identifier, to determine when a data source expects to return to a normal operating condition. Such information can, for example, be used to take remedial steps to hasten the data source's return to a normal operating condition and/or allow an enterprise to take other steps in anticipation of the data source not returning to a normal operating condition in the near future. Predicting when a data source may return to a normal operation condition, however, can be a time consuming and error prone task—especially when there are a substantial number of data sources. It would therefore be desirable to provide systems and methods to facilitate a determination of when a data source expects to return to a normal operating condition.

SUMMARY

A system is disclosed for data source feedback acquisition and processing. The system includes a data acquisition computer that may receive a first task request, including a data source communication identifier, from a back-end application. The data acquisition computer may perform a first data acquisition process and determine indications of: when the data source expects to return to a normal operating condition, a quality of service received by the data source from a service provider, and a quality of service performed by the back-end application server. The back-end application server might generate and transmit the task request, for example, a first pre-determined period of time after an event associated with the data source. The back-end application server may also detect that a second pre-determined period of time after the event has occurred and facilitate a second data acquisition process including at least one rating within a scale of ratings provided by the data source.

In addition, the system includes a data acquisition database storage unit in communication with the data acquisition processor and/or the back-end application server for storing data that represents data source feedback responses.

By facilitating a determination of when a data source expects to return to a normal operating condition, embodiments may provide improved data exchange over a distributed communication network.

With these and other advantages and features of the invention that will become hereinafter apparent, the invention may be more clearly understood by reference to the following detailed description of the invention, the appended claims, and the drawings attached hereto.

DETAILED DESCRIPTION

The present invention provides significant technical improvements to facilitate a determination of when a data source expects to return to a normal operating condition. The present invention is directed to more than merely a computer implementation of a routine or conventional activity previously known in the industry as it significantly advances the technical efficiency, access and/or accuracy of data created by devices described in connection with some embodiments by implementing a specific new method and system as defined herein. The present invention is a specific advancement in the areas of back-end application servers and/or data acquisition computers by providing technical benefits in data accuracy, data availability, data transparency, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized back-end, client, and/or third-party systems, networks, and subsystems. For example, in the present invention information may be transmitted from a remote data acquisition computer to a back-end application server and that information, including an indication of when a data source expects to return to a normal operating condition, may be responded to as appropriate in an accurate and transparent manner.

Figure 1:
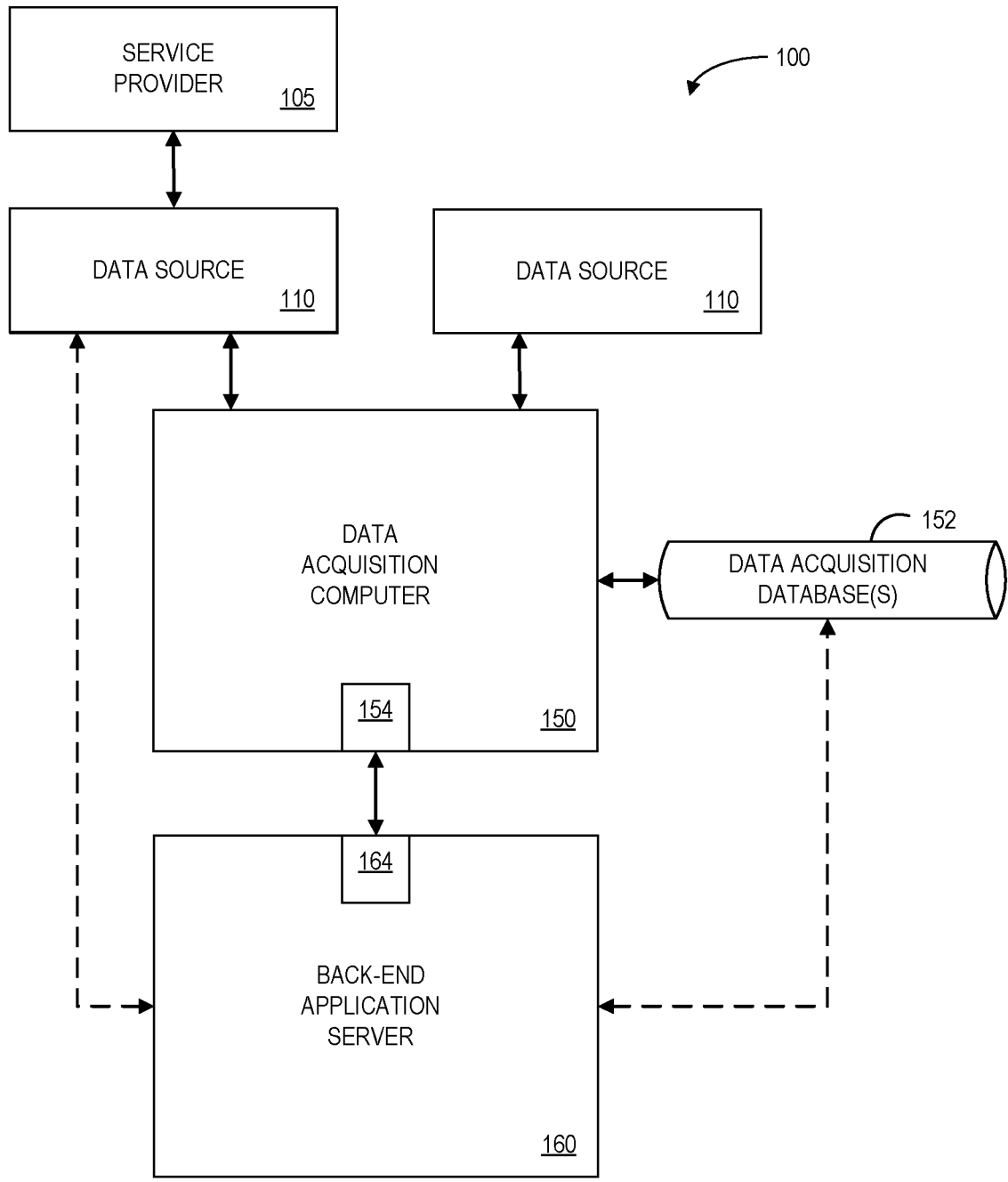
FIG. 1 is a high level block diagram that illustrates a system in accordance with some embodiments.

Some embodiments described herein may facilitate a determination of when a data source expects to return to a normal operating condition in connection with a back-end application server. Further, some embodiments may provide a mechanism that automates a user interface that might be used, for example, by operators and/or administrators of an enterprise computer server and/or a back-end application server. FIG. 1 is block diagram of a system 100 according to some embodiments of the present invention. In particular, the system 100 includes a back-end application server 160 that exchanges information with a data acquisition computer 150, either of which may store information into and/or retrieve information from a data acquisition database 152.

The back-end application server 160 might be, for example, associated with a Personal Computers ("PC"), a web portal, a laptop computer, an enterprise server, a server farm, and/or a database or similar storage devices. The back-end application server 160 may, according to some embodiments, further includes a rules engine and/or rendering component as described herein.

According to some embodiments, an "automated" back-end application server 160 and/or data acquisition computer 150 may help facilitate determinations of: when a data source 110 expects to return to a normal operating condition, a quality of service received by the data source 110 from a service provider 105, and a quality of service performed by the back-end application server 160. For example, the back-end application server 160 may automatically trigger a data collection or acquisition process by the data acquisition computer 150. As used herein, the terms "automated" and "automatically" may refer to, for example, actions that can be performed with little (or no) intervention by a human.

As used herein, devices, including those associated with the back-end application server 160 and any other device described herein, may exchange information via any distributed communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application server 160 may store information into and/or retrieve information from the database 152. The database 152 might also be associated with, for example, the data acquisition computer 150. The database 152 might be locally stored or reside remote from the back-end application server 160. According to some embodiments, the back-end application server 160 exchanges information about data source 110, such as by forwarding an electronic file or signal to an electronic transaction system, an electronic messaging communication server, and/or an external platform (e.g., a workflow management system, calendar application, etc.).

Note that the back-end application server 160 might communicate with the data acquisition computer 150 via one or more communication ports 154, 164. Further note that these ports 154, 164 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single back-end application server 160 and data acquisition computer 150 are shown in FIG. 1, any number of such devices may be included. Moreover, various devices described herein might be combined according to embodiments of the present invention. For example, in some embodiments, the back-end application server 160 and data acquisition database 152 might be co-located and/or may comprise a single apparatus.

Figure 2:
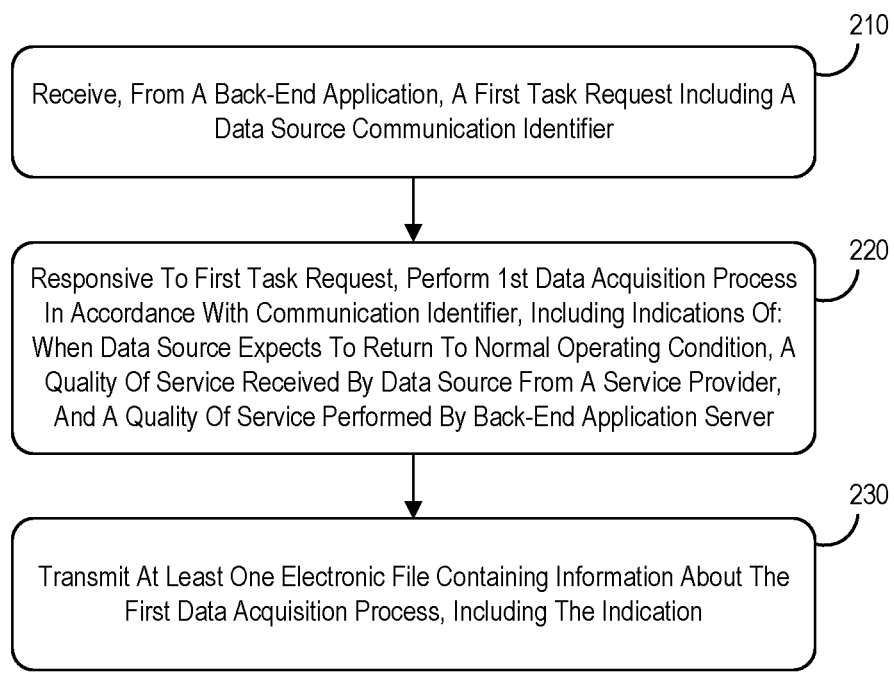
FIG. 2 is a flow chart that illustrates a data acquisition computer process that may be performed according to some embodiments.

FIG. 2 illustrates a method that might be performed, for example, by the data acquisition server 150 of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, embodiments may receive, at a data acquisition computer from a back-end application, a first task request including a data source communication identifier. Responsive to the first task request, the data acquisition computer may perform at 220 a first data acquisition process in accordance with the data source communication identifier. The first data acquisition process may include indications of: when the data source associated with the communication identifier expects to return to a normal operating condition, a quality of service received by the data source from a service provider, and a quality of service performed by the back-end application server. At 230, at least one electronic file containing information about the first data acquisition process, including the indication, may be transmitted to a data acquisition database. According to some embodiments, the data acquisition computer may further automatically transmit an alert signal to the back-end application server in substantially real time based on the quality of service received by the data source from the service provider or the quality of service performed by the back-end application server. Moreover, the data acquisition computer may also automatically transmit a batch of electronic files to the back-end application server on a periodic basis.

Figure 3:
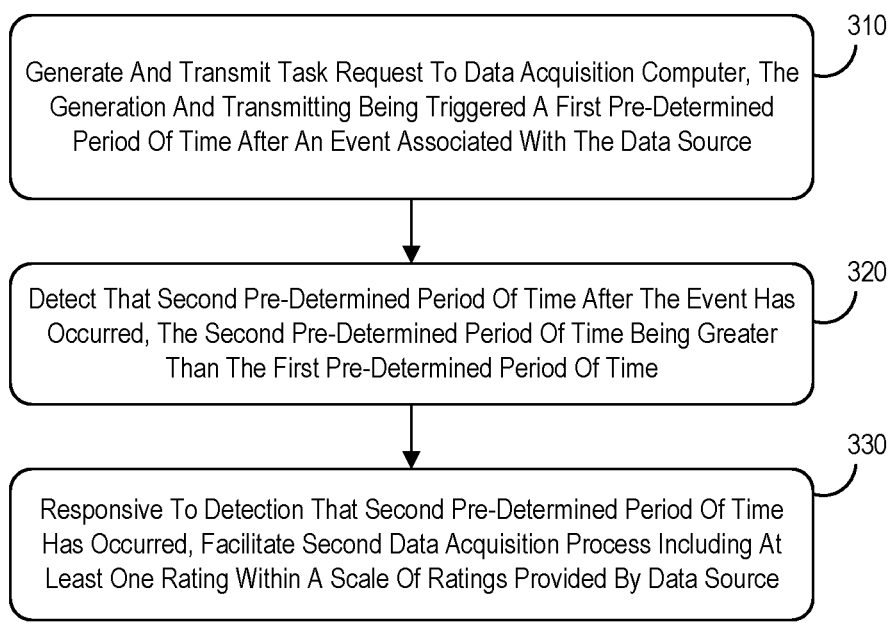
FIG. 3 is a flow chart that illustrates a back-end application server process that may be performed according to some embodiments.

FIG. 3 illustrates a method that might be performed, for example, by the back-end application server 160 of the system 100 described with respect to FIG. 1 according to some embodiments. At 310, the back-end application server may generate and transmit the task request to the data acquisition computer. This generation and transmitting may be triggered, for example, a first pre-determined period of time after an event associated with the data source. At 320, the back-end application server may detect that a second pre-determined period of time after the event has occurred (the second pre-determined period of time being greater than the first pre-determined period of time). Responsive to the detection that the second pre-determined period of time has occurred, the back-end application server may facilitate at 330 a second data acquisition process including at least one rating within a scale of ratings provided by the data source after the second pre-determined period of time. According to some embodiments, the back-end application server further determines if an exception condition prevents the first task request from being transmitted to the data acquisition computer.

In general, and for the purposes of introducing concepts of embodiments of the present invention, a computer system may be utilized to direct employees or vendors to conduct surveys relating to insurance policies and/or to claims that have yet to be resolved (e.g., interim surveys). Responses to latter interim surveys may be, for example, evaluated to detect when the open claims are going off-track from the insured, insurer, and/or claimant's point of view. Remedial action may be triggered through the computer system to rescue the handling of the claim and to secure the satisfaction and loyalty of all parties involved in the process.

Figure 4:
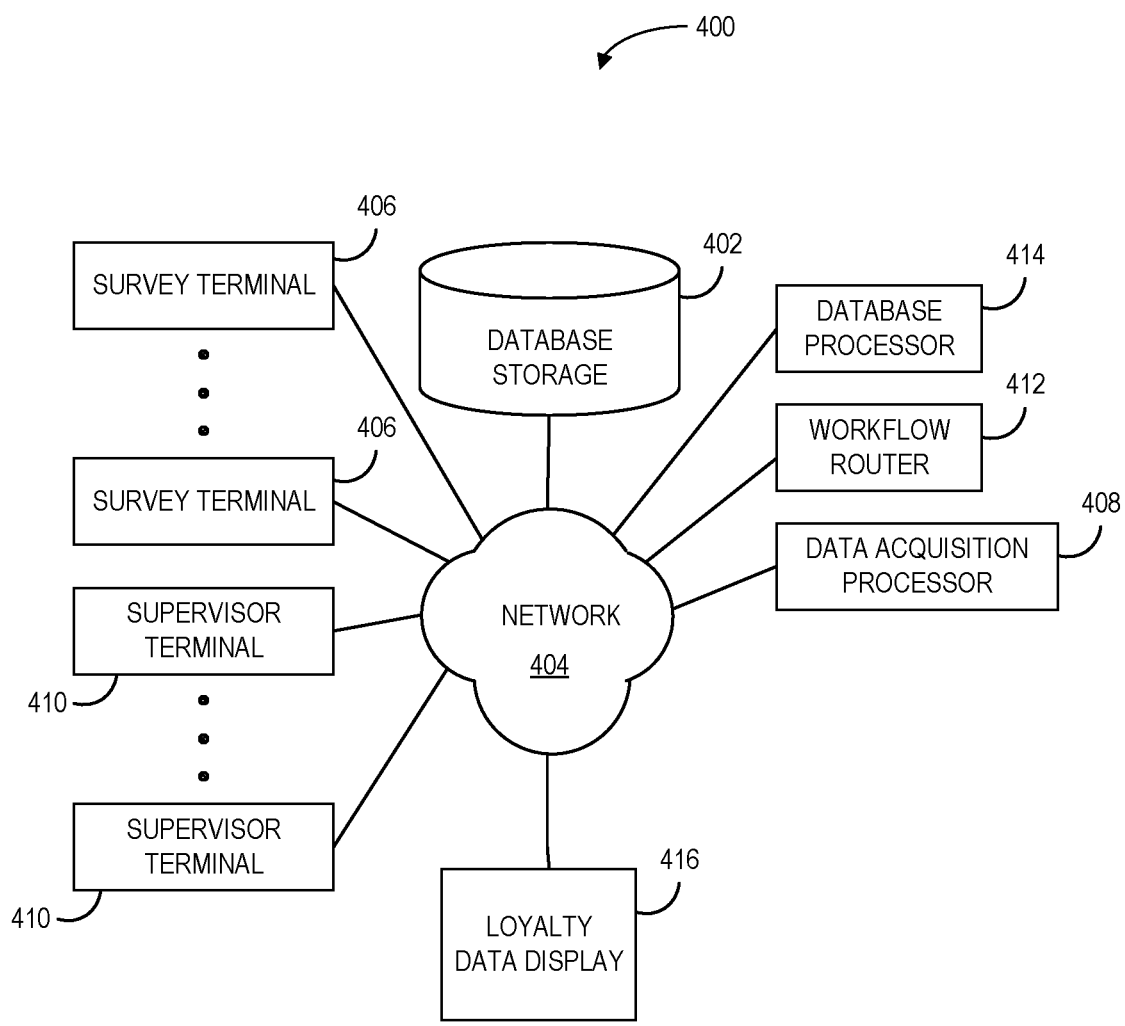
FIG. 4 is a partially functional block diagram that illustrates aspects of a computer system provided in accordance with some embodiments of the invention.

Features of some embodiments of the present invention will now be described by first referring to FIG. 4. FIG. 4 is a partially functional block diagram that illustrates aspects of a computer system 400 provided in accordance with some embodiments of the invention. For present purposes it will be assumed that the computer system 400 is operated by an insurance company (not separately shown) that may be associated with, for example, workers' compensation and/or group benefits insurance policies.

The computer system 400 includes a database storage module 402. In terms of its hardware the data storage module 402 may be conventional, and may be composed, for example, by one or more magnetic hard disk drives. A function performed by the data storage module 402 in the computer system 400 is to receive, store and provide access to files relating to insurance claims. The claims may be from one or more different lines of insurance, such as worker's compensation, group benefits, etc. The data storage module 402 may also store data that reflects responses by claimants to the data source satisfaction surveys that are described below. The data sources who are to be surveyed may be, for example, injured workers who are on short term disability and will hereinafter sometimes be referred to as "claimants" or "data sources." Still other data may be stored in the data storage module 402, including for example data that is relevant to a type or category of injury.

The data stored in regard to various claimant satisfaction surveys may include recordings of the claimants' voices. Although the data storage module 402 is depicted as a single device in FIG. 4, in practice its functions may be spread among a number of different devices, such as plural server computers which incorporate their own storage capabilities.

The computer system 400 may also include a distributed data communication network 404 to which the data storage module 402 is coupled. The data communication network 404 may, for example, be conventional in its construction and functionality, and may serve as an "intranet" for the insurance company. In some embodiments, the data communication network may also incorporate and/or be connected to a public data communication network (not separately shown), such as the Internet.

The computer system 400 may further include a number of terminals 406 that may be employed by employees of the insurance company and/or a third party who are assigned to conduct data source satisfaction surveys in regard to the company's handling of insurance claims. As will be seen, the terminals 406 (hereinafter referred to as "survey terminals"), may be constituted by conventional PCs coupled to the data communication network 404. One function that may be performed by the survey terminals 406 is to input data indicative of claimants' responses to interim and final (loyalty) claimant satisfaction surveys.

In addition, the computer system 400 may include a data acquisition processor 408 that is also coupled to the data communication network 404. The data acquisition processor 408 may be constituted by one or more conventional microprocessors included in one or more server computers (not separately shown in FIG. 4) that may be programmed to function in accordance with the present invention. The data acquisition processor 408 may function to receive the data source feedback response data from the survey terminals 406 (via the data communication network 404) and to store the data source feedback response data in the database storage module 402. The data acquisition processor 408 may also classify the data source feedback responses as to whether the responses are satisfactory, unsatisfactory, indicative of data source loyalty, etc. (In some embodiments, the responses may be at least partially so classified at the survey terminals 406, in which case the data acquisition processor 408 may be deemed to at least partially overlap with the survey terminals 406.) The data acquisition processor 408 may also generate alert messages to be sent to claim handlers and/or team leaders and batches of electronic files to be transmitted on a periodic basis (e.g., daily basis).

Still further, the computer system 400 may include a number of terminals 410 operated by supervisory employees of the insurance company or third party. Like the survey terminals 406, the terminals 410 (hereinafter referred to as "supervisor terminals") may be constituted by conventional PCs coupled to the data communication network 404. The supervisory employees who operate the supervisor terminals 410 may be charged with supervising claim handlers whose claim files are stored in the data storage module 402.

Moreover, the computer system 400 may include a workflow router 412 that is coupled to the data communication network 404 and thus is in communication, at least from time to time, with the data acquisition processor 408. The workflow router 412 may be constituted by one or more conventional microprocessors that may for example be included in one or more conventional server computers (not separately shown in FIG. 4). For example, the workflow router 412 may at least partially overlap with the data acquisition processor 408. The workflow router may operate to route, to the supervisor terminals 410, claim files determined, from claimants' responses to interim data source satisfaction surveys, to be in need of remedial attention to achieve data source satisfaction (e.g., resulting in an automatically generated alert message). For example, the workflow router 412 may generate different types of alert messages responsive to a poor quality of service received by the data source from a service provider (e.g., difficulty scheduling appointments with a health care provider) and a poor quality of service performed by the back-end application server (e.g., difficulty reaching or communicating with a claim handler). In some embodiments, the workflow router 412 may also operate to capture and record actions taken by supervisors in response to the messages to them that indicate a need for remedial attention.

The computer system 400 may also include a database processor 414 that is coupled to the data communication network 404, and thus is in communication, at least from time to time, with the database storage module 404. The database processor 414 may be constituted by one or more conventional microprocessors that may for example be included in one more conventional server computers (not separately shown in FIG. 4) that may be programmed to function in accordance with the present invention. For example, the database processor 414 may at least partially overlap with the data acquisition processor 408. The database processor 414 may operate to identify and report trends in data source feedback response data stored in the database storage module 404 by the data acquisition processor 408.

Still further, the computer system 400 may include a display device 416 that is coupled to the data communication network 404. Accordingly, the display device 416 may be in communication, at least from time to time, with the database processor 414. As will be appreciated from subsequent discussion, the display device 416 may be employed to provide one or more screen displays concerning claimant feedback responses to interim and/or final surveys, including summaries, trends and/or aggregations of claimant feedback response data.

Figure 5:
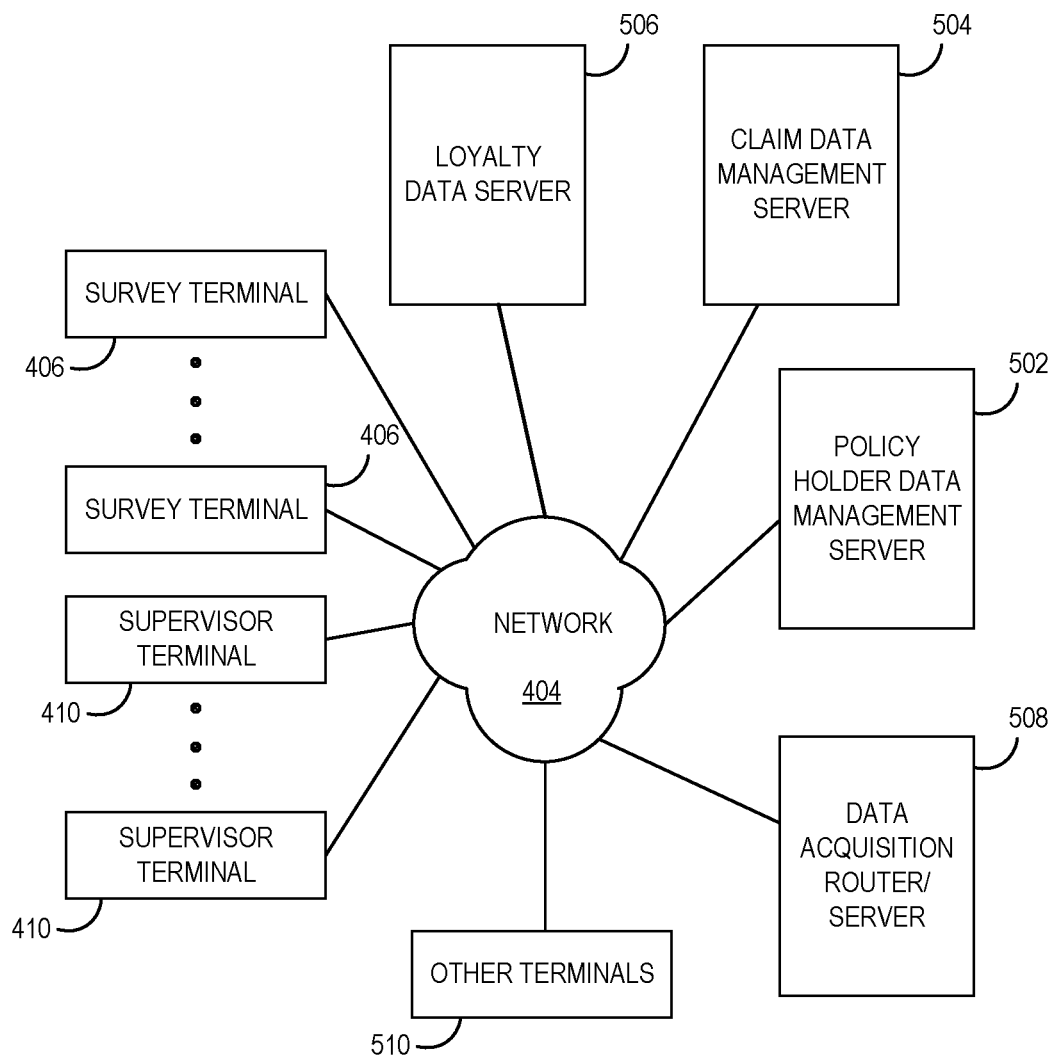
FIG. 5 is a block diagram that provides another representation of aspects of the system of FIG. 4.

FIG. 5 is a block diagram that provides another representation of aspects of the computer system 400 of FIG. 4. FIG. 5 shows the same data communication network 404, survey terminals 406 and supervisor terminals 410 that were depicted in, and described in connection with, FIG. 4. FIG. 5 also depicts other components of the computer system in a more hardware-oriented manner than FIG. 4. Thus, other components of the computer system shown in FIG. 5 may constitute components of the system that were functionally depicted in FIG. 4. For example, the computer system may include a policy holder data management server computer 502 and a claim data management server computer 504. The latter two servers may together constitute some or all of the functionality ascribed above to the data storage module 402 shown in FIG. 4. The policy holder data management server computer 502 and the claim data management server computer 504 may both be constituted and operated in a substantially conventional manner. The policy holder data management server computer 502 may store data concerning policies in force with the insurance company, including names, addresses, etc. of policy holders, types and terms of coverage, policy effective dates, coverage amounts, etc. The claim data management server computer 504 may store data concerning claims made against the insurance company, includes names and addresses of claimants, date of loss, and all other information accumulated during investigation and settlement/resolution of the claims.

Other components of the computer system 400 not explicitly depicted in FIG. 4, but shown in FIG. 5, may include a loyalty data server 506 and a data acquisition router/server 508. Both of the latter server computers are described below. Further, the computer system 400 may include a number of other terminals 510, which may be conventional PCs operated by various employees of the insurance company and/or its affiliates. Such employees may be, for example, individuals performing line and/or staff management functions, claim handlers, clerical and administrative employees, sales employees, etc. At least some of the other terminals 510 (like the terminals 406, 410) may include a conventional screen display (not separately shown in FIG. 5) for presenting to the user screen displays generated on the terminal in question or downloaded from another component of the computer system 400.

The computer system 400 may include other server computers (e.g., one or more billing or benefit servers) in addition to the server computers shown in FIG. 5. The functions ascribed to individual server computers herein may in practice be divided up among two or more different computers. Also, the functions shown or described as being performed in separate computers may in practice be combined within a single computer.

Figure 6:
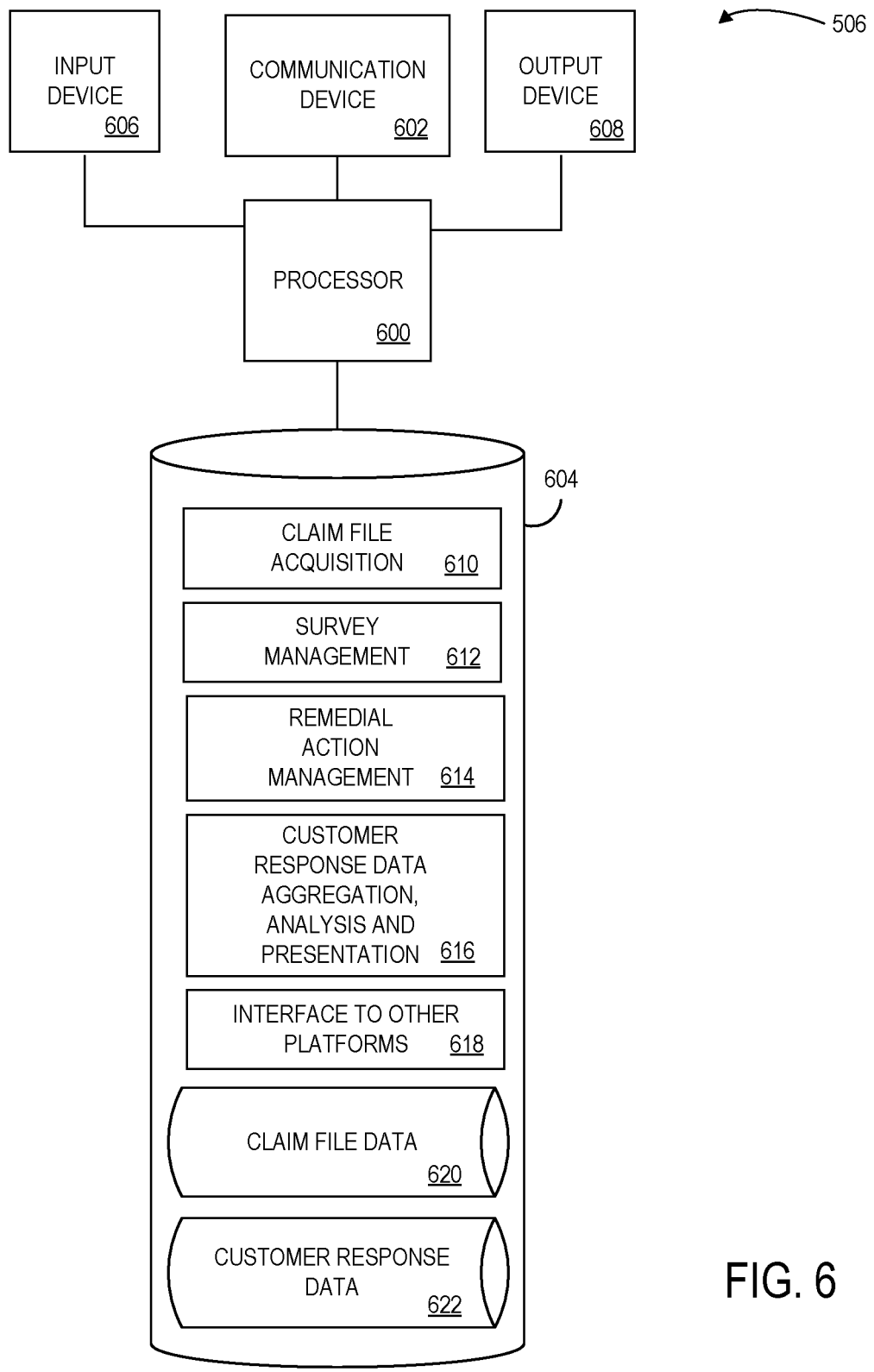
FIG. 6 is a block diagram that illustrates a loyalty data server that may form part of the system of FIGS. 4 and 5.

FIG. 6 is a block diagram that illustrates the loyalty data server 506. In its hardware aspects the loyalty data server 506 may be entirely conventional, but programmed to provide functionality as described herein.

As depicted, the loyalty data server 506 includes a computer processor 600 operatively coupled to a communication device 602, a storage device 604, an input device or devices 606 and an output device 608. The communication device 602 may be used to facilitate communication with, for example, other servers/terminals/personal computers coupled to the data communication network 404 (FIG. 4). Continuing to refer to FIG. 6, the input device(s) 606 may comprise, for example, a keyboard, a keypad, a mouse or other pointing device, a microphone, knob or a switch, an Infra-Red ("IR") port, a docking station, and/or a touch screen. The input device(s) 606 may be used, for example, to enter information. Output device 608 may comprise, for example, a display (e.g., a display screen), a speaker, and/or a printer. (Functionally, the terminals 506, 510 and/or 510 shown in FIG. 5 may also serve to output/display information downloaded thereto from the loyalty data server 506.)

Storage device 604 may comprise any appropriate information storage device, including combinations of magnetic storage devices (e.g., magnetic tape and hard disk drives), optical storage devices, and/or semiconductor memory devices such as Random Access Memory ("RAM") devices and Read Only Memory ("ROM") devices.

The storage device 604 stores one or more programs or portions of programs (at least some of which being indicated by blocks 610 to 618) for controlling the processor 600. The processor 600 performs instructions of the programs, and thereby operates in accordance with the present invention. In some embodiments, the programs may include a program or program module 610 that programs the loyalty data server 506 to acquire claim files (or excerpts therefrom) for which data source satisfaction surveys are to be performed.

Another program or program module stored on the storage device 604 is indicated at block 612 and is operative to allow the loyalty data server 506 to assign and manage administration of the data source satisfaction surveys.

Still another program or program module stored on the storage device 604 is indicated at block 614. The program (or program module) 614 may program the loyalty data server 506 to initiate, route and/or manage tasks that are to be performed to perform remedial action with respect to open claim files for which claimants' responses to interim surveys indicate that the claimant is dissatisfied with the handling to date of the claim and/or that the claimant does not expect to return to work for more than a pre-determined threshold period of time.

Another program/program module 616 programs the loyalty data server 506 to gather, receive, store and analyze data that represents claimants' responses to the interim and final data source satisfaction surveys. Among other functions that the program/program module 616 may cause the loyalty data server 506 to perform are aggregation of the claimants' responses and presentation of the aggregated response data to management and/or other employees of the insurance company.

A further program/program module 618 provides an interface between other program functions of the loyalty data server 506 and the selling proposition server computer 508 (FIG. 5). According to some embodiments, this program/program module 618 may further facilitate the generation of automatic alert signals based on claimant responses.

There may also be stored in the storage device 604 other software, such as one or more conventional operating systems, device drivers, communications software, database management software, etc.

Still further, various kinds of data needed for operation of the loyalty data server 506 may be stored in the storage device 604, including for example claim file data 620, and data source/claimant response data 622 (including, in some embodiments, a recording of the claimants voice) gathered in response to the above-mentioned surveys.

Figure 7:
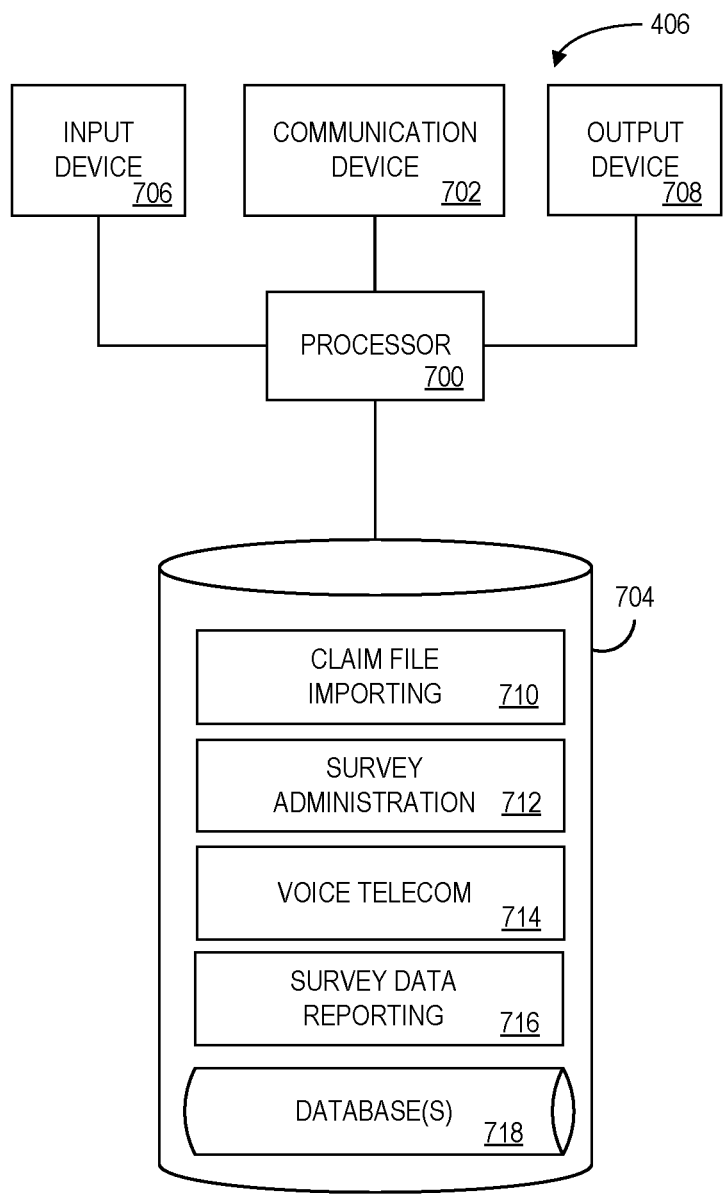
FIG. 7 is a block diagram that illustrates a personal computer that may be employed as a terminal for a survey employee in the system of FIGS. 4 and 5.

FIG. 7 is a block diagram that illustrates a typical one of the survey terminals 406 shown in FIGS. 4 and 5. Note that the survey terminals 406 might be associated with an insurer, an in-house vendor, and/or a third party acting on behalf of an insurer. In its hardware aspects, the survey terminal 406 may be entirely conventional, but may be programmed and/or may download interactive webpages so as to function in accordance with aspects of the present invention.

As depicted, the survey terminal 406 includes a computer processor 700 operatively coupled to a communication device 702, a storage device 704, an input device or devices 706 and an output device or devices 708. The communication device 702 may be used to facilitate communication with, for example, servers (e.g., the loyalty data server 506) and/or other terminals/personal computers coupled to the data communication network 404 (FIG. 4). Continuing to refer to FIG. 7, the input device(s) 706 may comprise, for example, a keyboard, a keypad, a mouse or other pointing device, a microphone, knob or a switch, an IR port, a docking station, and/or a touch screen. The input device(s) 706 may be used, for example, to enter information. Output device 708 may comprise, for example, a display (e.g., a display screen), a speaker, and/or a printer. In some preferred embodiments, the output device(s) 708 and the input device(s) 706 may collectively include a telephone handset and/or headset and/or speakerphone arrangement by which the user of the survey terminal 406 may engage in telephone conversations with claimants to whom the user administers data source satisfaction surveys. Data representing the telephone conversations (including either or both of the user's (survey employee's) voice and the claimant's voice) may pass through the survey terminal 406 as part of the voice communication channel between the survey employee and the claimant. At the same time, at least some of the voice data, including possibly the claimant's voice, may be stored in the storage device 704 for subsequent uploading to the loyalty data server 506.

The storage device 704 may comprise any appropriate information storage device, including combinations of magnetic storage devices (e.g., magnetic tape and hard disk drives), optical storage devices, and/or semiconductor memory devices such as RAM devices and ROM devices.

The storage device 704 stores one or more programs or portions of programs (at least some of which being indicated by blocks 710 to 716) for controlling the processor 700. The processor 700 performs instructions of the programs, and thereby operates in accordance with the present invention. In some embodiments, the programs may include a program or program module 710 that programs the survey terminal 406 to acquire (e.g., from the loyalty data server 506) claim files (or excerpts therefrom) for which data source satisfaction surveys are to be performed. In some embodiments, the program/program module 710 may be at least partially constituted by a browser program by which the user may access the user's work queue (stored, e.g., on the loyalty data server 506) and may access the individual claim files/file extracts by clicking on individual items in the user's work queue.

Another program or program module stored on the storage device 704 is indicated at block 712 and is operative to cause the survey terminal 406 to guide/prompt the user in administering the data source satisfaction surveys.

Still another program or program module stored on the storage device 704 is indicated at block 714. A program (or program module) 714 may control the survey terminal 406 so as to enable operation of the above-mentioned telephone terminal equipment that may be part of the survey terminal 406. In addition, or alternatively, the survey terminal 406 may include a dedicated voice/telecom card (not separately shown) which effectively couples the telephone terminal equipment to the processor 700 and drives/receives voice signals from the telephone terminal equipment.

Another program/program module 716 programs the survey terminal 406 to receive, store, and forward to the loyalty data server 506, data that represents claimants' responses to the interim claimant survey (including when a worker expects to return to work) and a final claimant satisfaction survey.

There may also be stored in the storage device 704 other software, such as one or more conventional operating systems, device drivers, communications software, database management software, etc. Still further, various kinds of data needed for operation of the survey terminal 406 may be stored in the storage device 704, as indicated at 718 in FIG. 7.

Figure 8:
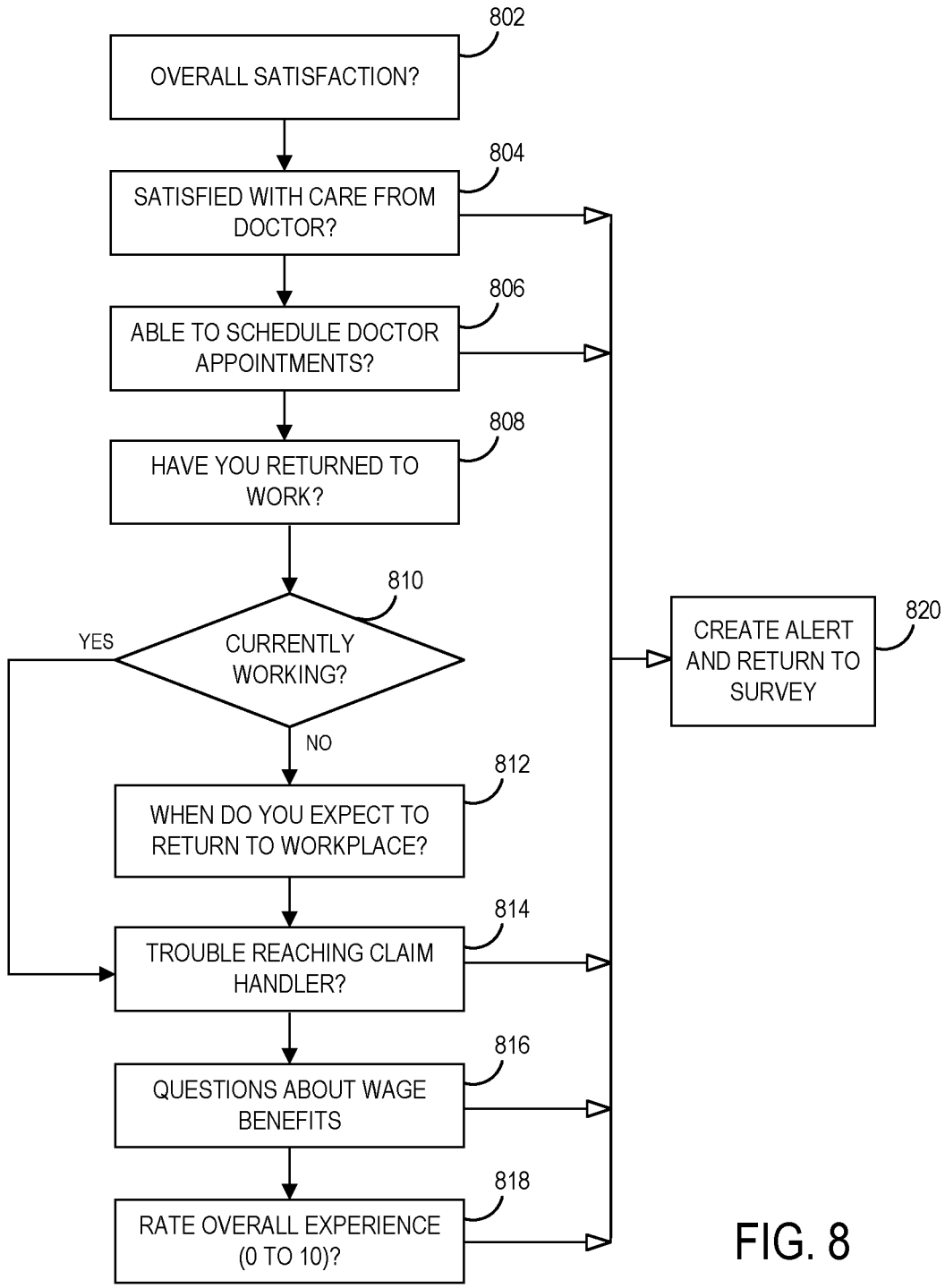
FIG. 8 illustrates a first data acquisition process that may be performed in accordance with some embodiments.

FIG. 8 is a flow chart that illustrates a process that may be performed in accordance with some of the embodiments described herein. The process may be associated with, for example, an interim survey, given to workers who have missed time from work, that is conducted 18 calendar days from a First Notice Of Loss ("FNOL"). The survey might be performed, for example, during a telephone call, a live chat session with an agent, etc. Note that embodiments described herein may be combined with other types of surveys and/or information gathering events, such as a medical survey and/or a nurse review. At 802, the worker may be asked if he or she is satisfied with the handling of his or claim at this point in time. The claimant's comments may be captured verbatim (e.g., a recording may be made of his or her comments). At 804, the claimant may be asked if he or she is satisfied with the care provided by a doctor (that is, a quality of service received by the claimant from a health care provider). The worker might respond with a "yes" or "no," and—in the case of "no," verbatim comments may be captured and included in an automatically generated alert transmitted at 820.

At 806, the claimant may be asked if he or she has been able to schedule doctor appointments as needed (another indication of a quality of service received by the claimant from a health care provider). The worker might respond with a "yes" or "no," and—in the case of "no," verbatim comments may be captured and included in an automatically generated alert transmitted at 820.

At 808, the claimant may be asked if he or she has returned to work. The worker might respond with a "yes (full duty)," "(yes (modified duty)" or "no," and—in the case of either "yes" at 810 the process may continue at 816. In the case of "no" at 810, the claimant may be asked at 812 when he or she expects to return to work. The question at 812 may be divided in categories of expected return to work dates, such as: less than one week, one to four weeks, five to twelve weeks, thirteen to twenty six weeks, over twenty six weeks, never, don't know, and/or uncategorized.

At 814, the claimant may be asked if he or she has had any difficulty reaching the claim handler assigned to the case (that is, a quality of service received by the claimant from the insurance enterprise). The worker might respond with a "yes" or "no," and—in the case of "yes," verbatim comments may be captured and included in an automatically generated alert transmitted at 820. At 816, the claimant may be asked if he or she has any questions about wage benefits. The worker might respond with a "yes" or "no," and—in the case of "yes," verbatim comments may be captured and included in an automatically generated alert transmitted at 820.

At 818, the claimant might be asked for his or her feelings so far, using a score from 0 to 10 with 10 being the best, how he or she would rate the insurance enterprise. The worker might respond with a number from 0 to 10, and—in the case of a number from 0 to 6 verbatim comments may be captured and included in an automatically generated alert transmitted at 820. Note to other information may collected during this process. For example, the claimant may be asked if he or she has trouble reaching a claim handler. The worker might respond with a "yes" or "no," and—in the case of "yes," verbatim comments may be captured and included in an automatically generated alert.

Note that different types of alerts might be created and transmitted at 820 depending on the reason for the alert. For example, alerts triggered by a poor quality of service received by the claimant from a health care provider might be sent to a first destination while alerts triggered by a poor quality of service received by the claimant from insurance enterprise might be sent to a second destination. Further note that quickly generating the alerts and taking the appropriate actions in response can expedite and generally improve the claimant's insurance experience. Moreover, data may be aggregated from multiple claimants to identify trends and/or potential problems (e.g., when many claimants have trouble scheduling appointments with a particular doctor or reaching a specific claim handling office). In some cases, an alert may be generated at 820 whenever the claimant has any type of question (e.g., even when the question is not associated with the particular data items described with respect to FIG. 8). Moreover, the data collected during the interim survey might be converted to text and mined to identify potential improvements and/or other opportunities. Such results may, for example, be shared with underwriters, risk managers, renewal specialists, etc.

Figure 9:
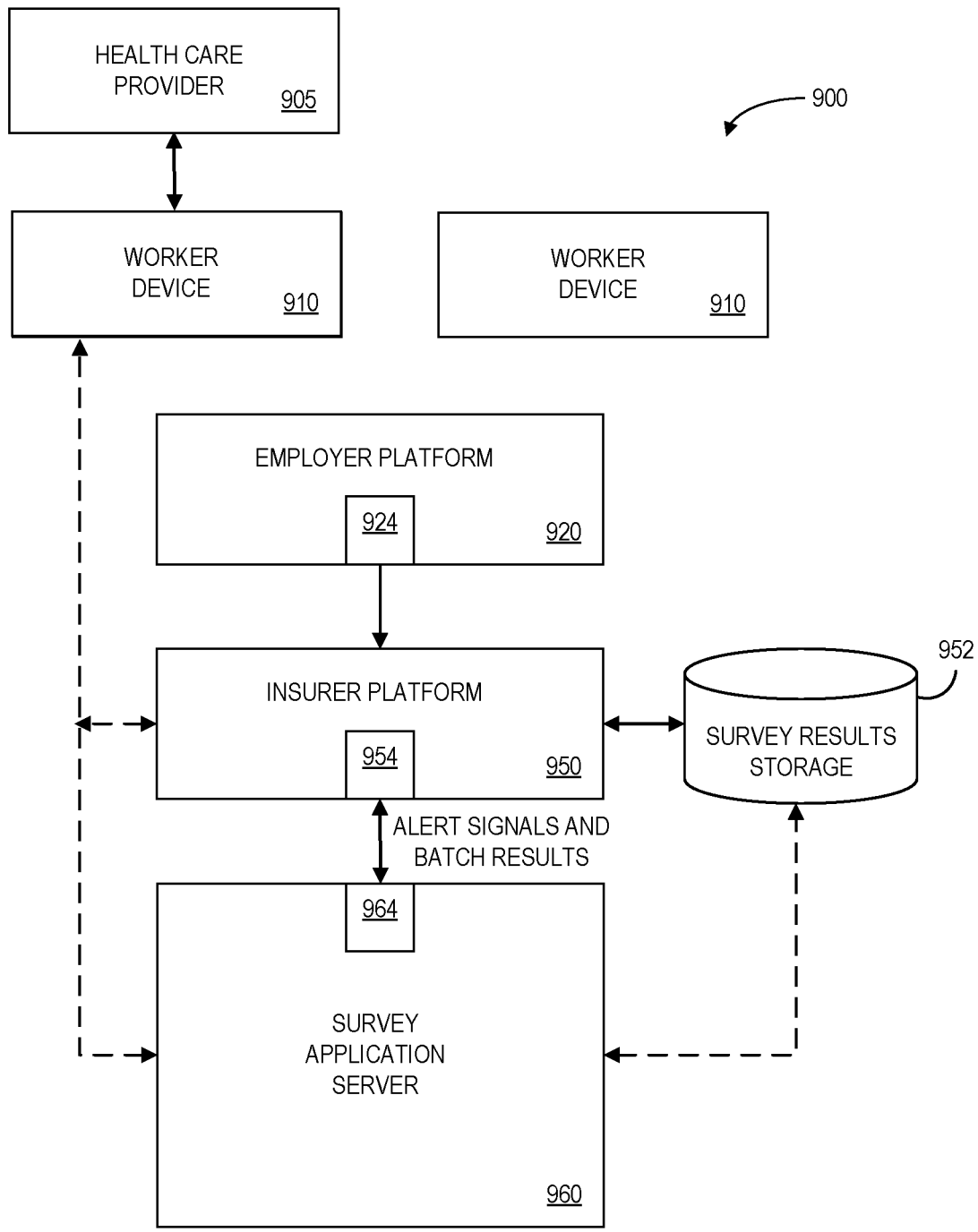
FIG. 9 is a high-level block diagram of an insurance system that could be provided in accordance with some embodiments.

The method of FIG. 8 may be performed by various hardware configurations. For example, FIG. 9 is block diagram of a system 900 according to some embodiments of the present invention. In particular, the system 900 includes a survey application server 960 that exchanges information with an insurer platform 950, either of which may store information into and/or retrieve information from survey results storage 952. According to some embodiments, the survey results storage 952 may further store: (i) a worker name, (ii) a worker score, (iii) a worker comment, (iv) a worker agent, (v) social network information about the worker, (vi) a claim identifier, (vii) a claim status, (viii) worker loyalty index data, and (ix) when the worker expects to return to a workplace. Still other types of information that might be in the survey results storage 952 include: (i) a satisfaction level associated with claim handling, (ii) a satisfaction level associated with medical treatment, (iii) a satisfaction level associated with appointment scheduling, (iv) whether or not it is difficult to reach a claims handler, (v) whether or not there are questions about wage benefits, and (vi) an overall satisfaction score.

The survey application server 960 might be, for example, associated with a PC, a web portal, a laptop computer, an enterprise server, a server farm, and/or a database or similar storage devices. The survey application server 960 may, according to some embodiments, further includes a rules engine and/or rendering component as described herein.

According to some embodiments, an "automated" survey application server 960 and/or insurer platform 950 may help facilitate determinations of: when a worker associated with a worker device 910 expects to return to a normal operating condition (i.e., return to his or her workplace), a quality of service received by the data source from a health care provider 905, and a quality of service performed by the insurer platform 950. For example, the survey application server 960 may automatically trigger a data collection or acquisition process by the insurer platform 950 (or vice versa). As used herein, the terms "automated" and "automatically" may refer to, for example, actions that can be performed with little (or no) intervention by a human. Moreover, the phrase "worker device" might be associated with a telephone call, a web survey, and/or an email survey.

As used herein, devices, including those associated with the survey application server 960 and any other device described herein, may exchange information via any distributed communication network which may be one or more of a LAN, a MAN, a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The survey application server 960 may store information into and/or retrieve information from storage 952. The storage 952 might also be associated with, for example, the insurer platform 950. The storage 952 might be locally stored or reside remote from the survey application server 960. According to some embodiments, the survey application server 960 exchanges information about a worker device 910, such as by forwarding an electronic file or signal to an electronic transaction system, an electronic messaging communication server, and/or an external platform (e.g., a workflow management system, calendar application, etc.). According to some embodiments, an employer platform 920 may provide information to the insurer platform 950 (e.g., information about a FNOL, a worker telephone number or email address, etc.).

Note that the survey application server 960, insurer platform 950, and/or employer platform 920 might communicate via one or more communication ports 924, 954, 964. Further note that these ports 924, 954, 964 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single survey application server 960 and insurer platform 950 are shown in FIG. 9, any number of such devices may be included. Moreover, various devices described herein might be combined according to embodiments of the present invention. For example, in some embodiments, the survey application server 960 and survey results storage 952 might be co-located and/or may comprise a single apparatus.

Note that embodiments may be associated with a workers' compensation insurance claim and/or a group benefits insurance claim. According to some embodiments, a survey terminal computer may be programmed to: (i) receive, from a back-end application, a first survey request including a worker communication identifier, (ii) responsive to the first survey request, perform a first survey in accordance with the worker communication identifier, the first survey including indications of when the worker associated with the communication identifier expects to return to a workplace, a quality of service received by the worker from a health care provider, and a quality of service performed by the insurer, and (iii) transmit at least one electronic file containing survey results, including the indication (e.g., to a survey results database)

According to some embodiments, a back-end application server, remote from and in communication with the survey terminal computer and the survey results database, may be programmed to: (iv) generate and transmit the first survey request to the data acquisition computer, said generation and transmitting being triggered a first number of days after a FNOL associated with the worker, (v) detect that a second number of days after the FNOL has occurred, the second number of days being greater than the first number of days, and (vi) responsive to the detection that the second number of days has occurred, facilitate a second survey including at least one satisfaction rating provided by the worker after the second number of days.

The survey terminal computer may, according to some embodiments, automatically transmit an alert signal to the back-end application server in substantially real time based on information received from the worker. Moreover, according to some embodiments, a voice recording device in communication with the survey terminal computer may store a worker voice recording, and the worker voice recording may be included in the alert signal. The survey terminal computer may also automatically transmit a batch of electronic files to the back-end application server on a periodic basis (e.g., on a daily basis).

According to some embodiments, the back-end application server determines if an exception condition prevents the first task request from being transmitted to the survey terminal computer. By way of examples only, the first task request might not be transmitted in connection with: (i) a death, (ii) a dismemberment, (iii) an amputation, (iv) Hepatitis, (v) AIDS, (vi) silica or asbestos, (vii) an injury from a needle, (viii) an assault, (ix) a mental health issue, (x) terrorism, (xi) an unreserved claim, (xii) a claim where the claimant is the insured, (xiii) a claimant represented by an attorney, (xiv) claims involved in a litigation, (xv) a denied claim, and/or (xvi) a claim closed without a payment.

According to some embodiments, a loyalty rating for the worker is determined by assigning a worker loyalty value to worker feedback response, wherein the worker is classified as being in a potential-detractor category when the worker loyalty value is below first threshold value and the worker is classified as being in a potential-promoter category when the data source loyalty value is above pre-determined threshold value. Moreover, a worker loyalty index may be calculated for a plurality of workers, the worker loyalty index being based on an overall amount of workers in the potential-promoter category reduced by an overall amount of workers in the potential-detractor category.

Figure 10:
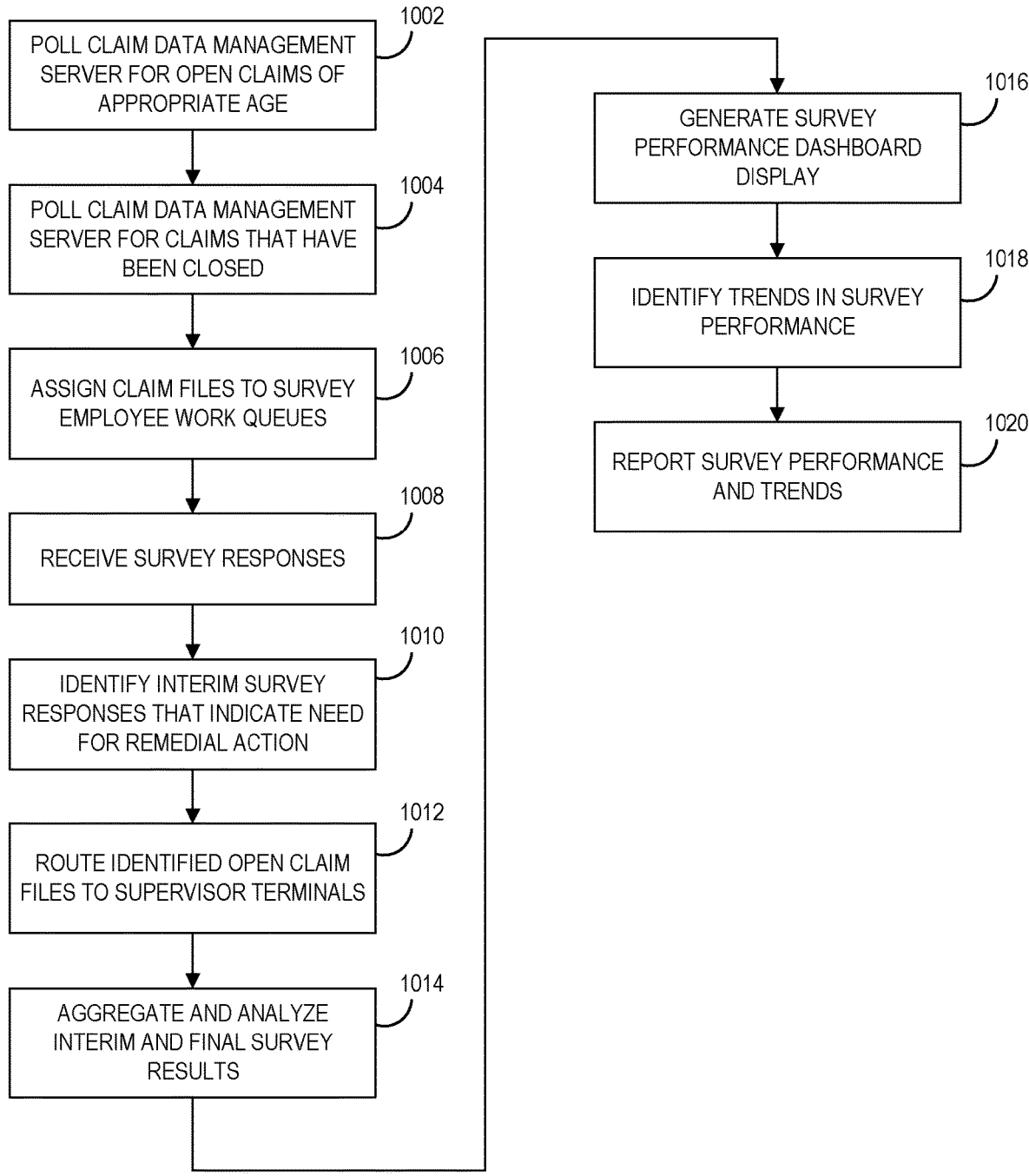
FIG. 10 is a flow chart that illustrates a process that may be performed by the loyalty data server of FIG. 6 or other devices described herein.

FIG. 10 is a flow chart that illustrates a process that may be performed by the loyalty data server 506 of FIG. 6 or other devices described herein. At 1002 in FIG. 10, the loyalty data server 506 makes contact with the claim data management server computer 504 to determine whether there are open claim files that are currently suitable for administering interim data source satisfaction surveys to the claimants that correspond to the files. For example, the loyalty data server 506 may learn from the claim data management server computer 504 what claim files have been open for a certain number of days and have not yet been closed/resolved. In some embodiments, the point in time at which a claim file is deemed "ripe" for an interim survey may vary with the type of claim. For example, a worker's compensation case may be ripe for an interim survey a different number of days after a FNOL as compared to another type of claim. The number of days may vary with the type of claim because the timing of an activity to be performed in connection with a claim may vary with the type of claim.

In some embodiments, open claims of a suitable age (=days since FNOL) may be randomly selected for interim survey from the universe of such claims. In some embodiments, some open claims may be disqualified from interim survey by certain factors; e.g., claims involving a fatality or litigation may be disqualified. In some embodiments, all qualified open claims may be interim surveyed.

Step 1002 may also include the loyalty data server 506 obtaining the pertinent claim files or file extracts, or hyperlinks pointing to the same, from the claim data management server computer 504.

At 1004, the loyalty data server 506 makes contact with the claim data management server computer 504 to determine whether there are files eligible for a subsequent (potentially, final) claimant satisfaction survey. This step may also include the loyalty data server 506 obtaining the pertinent claim files or file extracts, or hyperlinks pointing to them, from the claim data management server computer 504. The subsequent survey may be triggered by a certain event, which may vary with type of claim. For a worker's compensation claim, the subsequent survey may be triggered at a set time (e.g., 120 days after FNOL) or upon transition to handling of the file by a nurse claim manager.

In some embodiments, there may be more than one subsequent survey, and thus a total of three or more surveys for the claim. In some embodiments, surveys may be initiated on an ad hoc basis. For example, in the case of a catastrophic loss event, some or all claimants may be surveyed to evaluate how well the insurance company has responded to the catastrophic event.

In some cases, a pattern in the responses to one survey may suggest a need or advantage for an additional survey to gain more information concerning issues raised by the survey responses. At 1006, the loyalty data server 506 assigns either or both open claim files (for interim data source satisfaction surveys) or closed claim files (for final data source satisfaction surveys) among the survey employees available to perform such surveys. In some embodiments, the assignment of claim files to survey employees is entirely random. In other embodiments, the assignment of claim files to survey employees is partially random, but also reflects the survey employees' experience with respect to type of claim, line of insurance and/or with respect to conducting interim versus final data source satisfaction surveys. In some embodiments, assignments of closed claim files are preferably or mandatorily made to the same survey employee who conducted an interim data source satisfaction survey (if any) for the closed claim file in question. In other embodiments, it is preferred or mandatory that the survey employee assigned to administer the final data source satisfaction survey not be the same individual who conducted an interim survey for the claim.

In some embodiments, assignment of a claim file (either open or closed, as the case may be) to a survey employee may be accomplished by the loyalty data server 506 placing a corresponding hyperlink in the survey employee's work queue. Alternatively, the loyalty data server 506 may effect assignment of the claim file to the survey employee by sending to the survey employee an electronic mail message which contains such a hyperlink. Either of these actions may be considered to constitute "routing" the claim file to the survey employee and/or to his/her survey terminal 406.

In assigning the claim files, the loyalty data server 506 may append or link thereto the appropriate survey script for guiding the survey employee in conducting the desired data source satisfaction survey. In the case of an open claim file, the appended survey script may be suitable for conducting an interim data source satisfaction survey. In the case of a closed/resolved claim file, the appended survey script may be suitable for conducting a final data source satisfaction survey. In either case, the survey script may be tailored as appropriate to the type of claim and/or to details of the particular claim or attributes of the claimant.

Continuing to refer to FIG. 10, at 1008 the loyalty data server 506 may receive, from the survey terminals 406, data that reflects the claimants' responses to the interim and final data source satisfaction surveys. In some embodiments, this data may include entries made by the survey employees to characterize the claimants' responses as requiring further attention ("attention-needed") or not requiring further attention ("attention-not-needed"). In some embodiments, the responses, whether explicitly stated by the claimants or characterized by the survey employees, may be on a numerical scale from best to worst (or vice versa). In some embodiments, the data received by the loyalty data server 506 from the survey terminals 406 may include data that represents recordings of claimants' voices and/or survey employees' voices recorded during the course of the surveys. In some embodiments, the claimant's response to a "scale of 0-10" satisfaction question may be used to categorize the data source as "loyal", "passive", or potentially a "detractor". Responses to further questions, or reasons given by the claimant for his/her satisfaction rating, may be used to assign the claimant to a more detailed category or subcategory. Voice recognition and/or machine text analysis may be used for this purpose, or the survey employee may make the categorization/sub-categorization of the data source. Either the satisfaction rating alone, or details of the claimant's response, or a question asked by the claimant, may lead to the claim file being flagged as "attention-needed". Note that according to some embodiments, certain claimants may be identified as "potential-promoters" of the insurance entity. In this case, those data sources might be asked for permission to include information about them in a testimonial marketing message.

At 1010, and based on claimants' responses to interim surveys, the loyalty data server 506 identifies open claim files for which remedial action should be taken. That is, the loyalty data server 506 identifies open claim files for which the claimants' responses indicated that the claimants were not satisfied with the manner in which the insurance company was handling their claims and/or that they did not expect to return to work in the near future. Then, at 1012, the loyalty data server 506 routes each such open claim files to the supervisor terminal 410 operated by the supervisor of the claim handler to whom the claim file was assigned for processing. In some embodiments, the supervisor in question for the open claim file, and/or a network address for his/her supervisor terminal 410, and/or the supervisor's e-mail address may be included in the open claim file or extract that the loyalty data server 506 obtained for the claim in question from the claim data management server computer 504. In other embodiments, or other cases, the loyalty data server 506 obtains the identity/network address of the supervisor from the claim data management server computer 504 after identifying the open claim file as being in need of remedial action.

In some embodiments, step 1012 may be accomplished by the loyalty data server 506 sending an appropriate electronic mail message to the supervisor. In other embodiments, the same may be accomplished by the loyalty data server 506 adding an item concerning the claim file to the supervisor's work queue. Either of these may include making available to the supervisor a hyperlink that points to the claim file.

In some embodiments, the responses to the data source satisfaction surveys may also be used in appraising claim handlers' job performance. At 1014, the loyalty data server 506 collates the data source responses to the surveys. For example, the loyalty data server 506 may aggregate all interim survey responses that fall in the same category with respect to the degree of data source satisfaction with the handling of the claim. The aggregation of the responses may be on a question-by-question and/or claim-by-claim basis. The same may be done with respect to final survey responses. The response data for interim and final surveys may, but need not, be combined.

At 1014, the loyalty data server 506 may also perform various statistical analyses with respect to the survey response data. For example, the loyalty data server 506 may generate analyses which trace trends (step 1018) in the survey response data, and/or which aggregate the survey response data by period of time (e.g., daily, weekly, monthly, quarterly and/or annually), by claim-handling office, by individual claim handler, by work group, etc., by type of claim, by line of insurance, etc. Other analyses may provide averages of data source satisfaction ratings, standard deviations, etc. Based, for example, on these analyses and/or aggregations, the loyalty data server 506 may generate (step 1016) and make available to some or all insurance company employees (via the computer system 100 and/or terminal components thereof, as referred to above) one or more graphical displays that reflect the data, the aggregations thereof and/or the analyses thereof.

The loyalty data server 506 may also analyze survey responses to determine effects of remedial action following negative responses to interim surveys or pessimism regarding a return to work schedule. For example, the loyalty data server 506 may examine final survey results for claim files in which remedial action followed a negative response to an interim survey, in order to determine whether and/or to what extent the remedial action resulted in improved data source satisfaction and/or data source loyalty.

Further, as indicated at 1020 in FIG. 10, the loyalty data server 506 may generate and make available various reports. These reports may reflect the claim handling performance and trends therein as indicated by the data source survey response data. The reports may be in pre-determined formats, or in formats prescribed on demand by authorized employees. The reports may summarize all available data source response data or may present subsets of the data source response data by type of claim, line of business, geographical area, etc.

Figure 11:
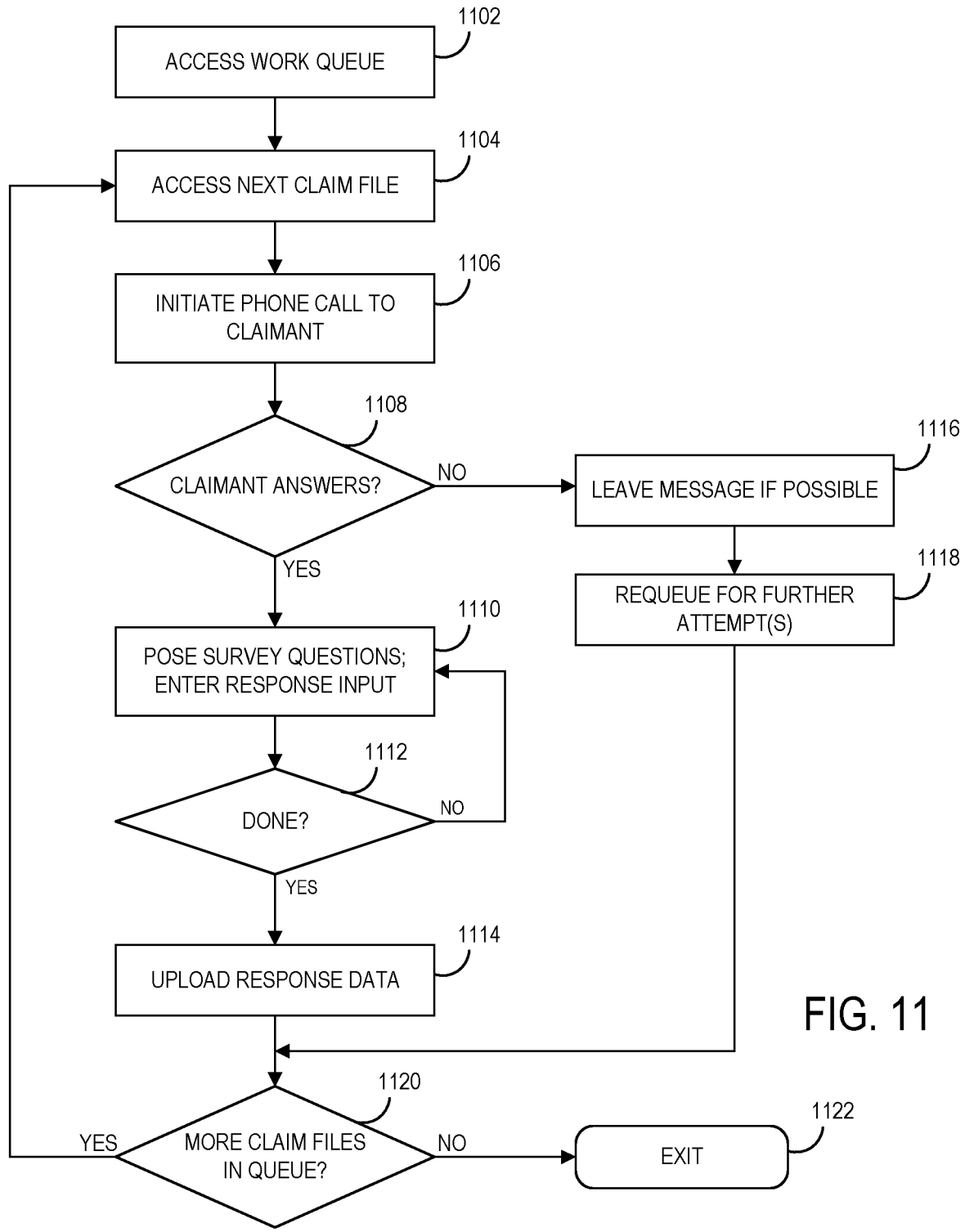
FIG. 11 is a flow chart that illustrates a process that may be performed by the survey employee terminal of FIG. 7 or other devices described herein.

FIG. 11 is a flow chart that illustrates a process that may be performed by/with a typical one of the survey terminals 406. At 1102 in FIG. 11, the survey employee operates his/her survey terminal 406 to access his/her work queue. At 1104, the survey employee operates the survey terminal 406 to access the next/first claim file in the work queue. This may occur, for example, by the survey employee "clicking" on the first entry in the work queue, assuming that the first entry is a hyperlink that points to the claim file (or extract) in question.

At 1106 in FIG. 11, the survey employee may use the survey terminal 406 to initiate a telephone call to the claimant for the claim file accessed at 1104. For example, the accessed claim file, or extract, may include the claimant's telephone number in a pre-determined data field. The survey terminal 406 may present a Graphical User Interface ("GUI"; not shown) to the survey employee. The GUI may include a virtual "start call" button or the like that the survey employee may "click" in order to launch a telephone call via the survey terminal 406 to the claimant's telephone number.

Following 1106 in the process of FIG. 11, there is a decision block 1108. At decision block 1108, it is determined whether the claimant answers the telephone call placed at 1106. If so, then block 1110 follows decision block 1108. At 1110, with the claimant's consent, the survey employee proceeds to pose the survey questions to the claimant. In some embodiments, prior to posing the questions, the survey employee obtains the claimant's consent to have his/her voice recorded as part of the survey.

From previous discussion it will be understood that the survey may be an "interim" survey to be administered while the claim remains open, or a "final" survey to be administered after the claim has been resolved.

In some embodiments, the interim survey may be quite brief. For example, the initial question may be open-ended, such as asking the claimant how his/her over-all claim experience is going so far. The survey employee may judge whether the claimant's response is positive, neutral or negative and may ask different follow-up questions accordingly. The survey employee may also interact with the survey terminal GUI to provide input to the survey terminal 406 (and thereby to the computer system) as to whether the claimant's response to the initial question is positive, neutral or negative.

In the case of a positive response to the initial question, the survey employee may follow up by asking the claimant whether there was something specific that made the claimant feel positive about the claim experience. In some embodiments, the survey employee may determine a category for the claimant's response to the follow-up question (e.g., among categories presented to the survey employee via the survey terminal GUI) and may provide data entry accordingly into the GUI.

In the case of a neutral response, the survey employee's follow-up question may ask the claimant if there is something that the insurance company could do differently to provide better service. Depending on the claimant's response, the survey employee may operate the survey terminal 406 flag the claim file for remedial action. In addition or alternatively, the survey employee may provide data entry into the survey terminal 406 to indicate a category for the claimant's response to the follow-up question, and/or may provide a text/narrative description of the claimant's response.

In the case of a negative response from the claimant, the survey employee may acknowledge the claimant's dissatisfaction, and may follow up by asking if there is something specific that the insurance company could do better to improve its service to the claimant. Preferably, the survey employee would operate the survey terminal 406 to flag the claim file for remedial action. Alternatively, the claim file may automatically be flagged for remedial action simply by the survey employee indicating that the claimant's response to the initial question was negative. In addition, the survey employee may operate the survey terminal 406 to provide text/narrative/categorization or other data entry in order to input the claimant's response into the survey terminal 406.

The interim survey may close with two more questions, namely asking the claimant to rate his/her experience on a scale of 0 to 10, and asking for the claimant's e-mail address (if not already in the claim file). In either or both cases the survey employee may enter the claimant's response into the survey terminal 406. The survey employee may also ask the claimant whether he/she would be willing to be contacted for a subsequent survey at a later stage in the claim process.

A final survey script may also be rather brief. The final survey may begin with the survey employee asking the claimant to rate, on a scale of 0 to 10, how likely it is, based on the claimant's experience with the recently closed claim, that the claimant would recommend the insurance company to a friend or relative or business associate. In other questions, the survey employee may ask the claimant what he/she would tell other people about the insurance company, and/or may ask about specific aspects of handling the type of claim in question. Also, in cases where the claimant is not currently a policy holder, the survey employee may ask the claimant to rate, on a scale of 0 to 10, how likely the claimant is to consider buying insurance coverage from the insurance company.

With respect to all of these questions, the survey employee may operate the survey terminal 406 to enter data that reflects the claimant's responses.

With respect to either or both of the interim survey and the final survey, step 1110 may include recording at least part of the telephone call, including either or both of the claimant's voice and the survey employee's voice. For both the interim and final surveys, the survey design may be such that the survey can typically be completed in two to three minutes.

Decision block 1112 in FIG. 11 indicates that the survey employee continues with the survey until it is determined that the survey is complete. Thus, if the survey is not complete, the process loops back from decision block 1112 to block 1110. When the survey is determined to be complete, the process of FIG. 11 advances from decision block 1112 to block 1114. At block 1114, the survey terminal 406 uploads the data representing the survey responses to the loyalty data server 506. (Alternatively, this may later be done in a batch mode with data for the surveys for other claim files.) The uploaded data may include both the information entered by the survey employee and also data that represents the sound recording of the survey telephone call.

Considering again decision block 1108 in FIG. 11, if it is determined at that point that the claimant has not answered, then the process of FIG. 11 may branch from decision block 1108 to block 1116. At block 1116, the survey employee may, if possible, leave a voice message for the claimant. For example, the survey employee may indicate in the message that he/she will attempt at a later time to contact the claimant, or ask the claimant to call back, or ask the claimant to send an electronic mail message as to when to call again. Further, at 1118, the survey employee (or the survey terminal acting automatically) may re-queue the claim file for one or more further attempts to reach the claimant by telephone. In some embodiments, the number of permissible attempts to reach the claimant may be limited, and the number of attempts made may be kept track of, so that the claim file is not re-queued when the limited number of attempts has been reached. Note that the actions described in connection with 1116 and 1118 are optional and do not need to be included in any of the embodiments described herein.

Following either 1118 or 1114, as the case may be, is a decision block 1120. At 1120 it is determined whether there are any more claim files in the survey employees' work queue. If not, the process exits (1122). Otherwise, the process loops back from decision block 1120 to block 1104 for the purpose of accessing the next claim file in the work queue.

Figure 12:
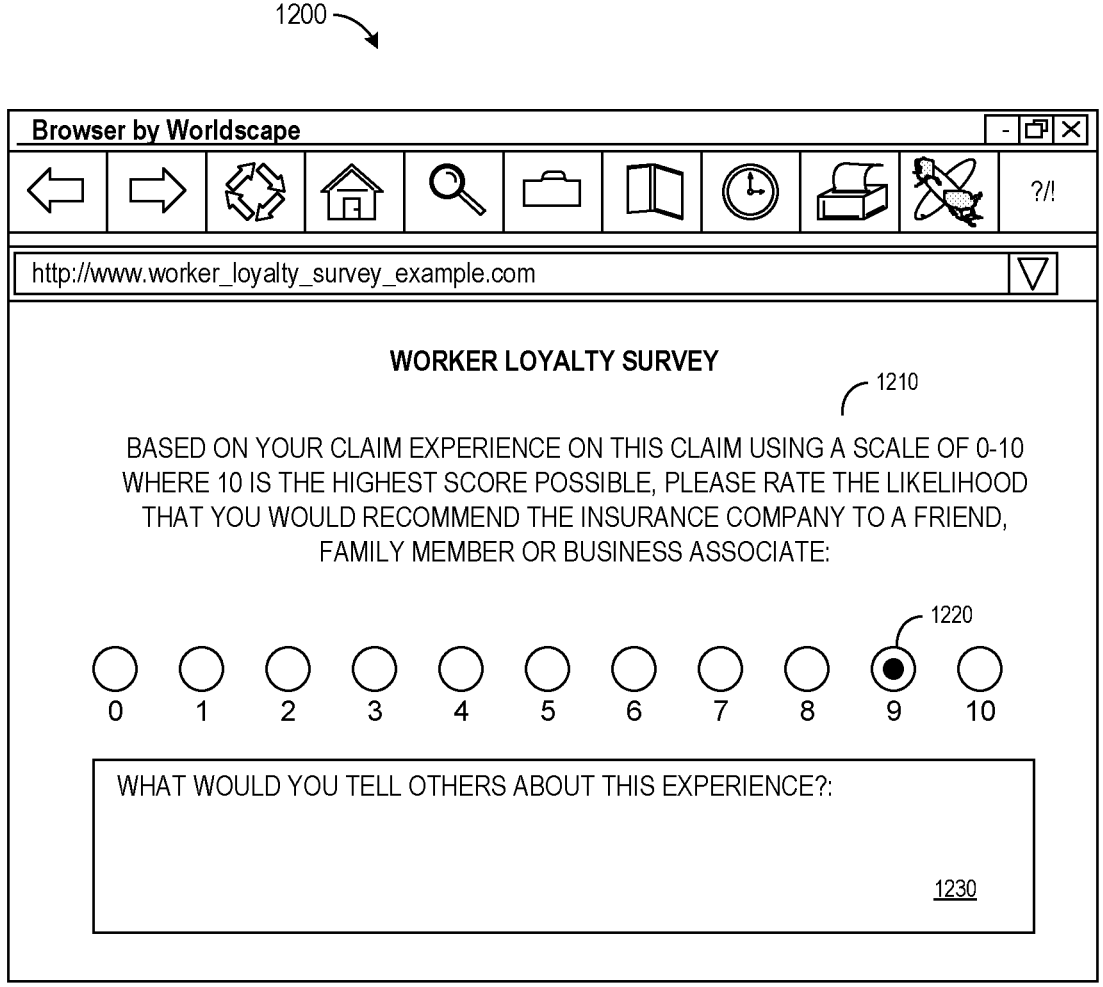
FIG. 12 is display illustrating a portion of a data source loyalty survey that might be displayed to a data source in accordance with any of the embodiments described herein.

FIG. 12 is an example of a worker loyalty survey 1200 that might be displayed in accordance with some embodiments. The survey 1200 includes a question 1210 asking the worker to rate his or her experience from 0 to 10 (with 10 being the best experience). The survey 1200 further includes a worker response input area 1220 that can be used to provide his or her rating. According to some embodiments, the claimant feedback response may be automatically classified (e.g., by a data acquisition processor) in one of two categories, the two categories being a "potential-promoter category" and a "non-potential-promoter" category. This might include assigning a data source loyalty index value to the portion, wherein the portion is classified as being in the potential-promoter category when the data source loyalty index value exceeds a pre-determined threshold value. In the example of FIG. 12, data source answers might be categorized as follows:

| | |
|---|---|
| 0-6 | potential detractors |
| 7-8 | passive data sources |
| 9-10 | potential promoters | with both "potential detractors" and "passive data sources" being considered as falling into the "non-potential promoter" category. That is, a data source who was highly satisfied with his or her experience may be much more inclined to let his or her information be used in a testimonial marketing message. According to some embodiments, the data source feedback response may further be stored in a claim file and/or provided to a supervisor to facilitate an appropriate handling of the data source's claim. For example, alerts might be transmitted to supervisors on an hourly basis after data source feedback responses are received that meet one or more pre-determined conditions (e.g., claimants who provide an answer below a threshold value).

Figure 13:
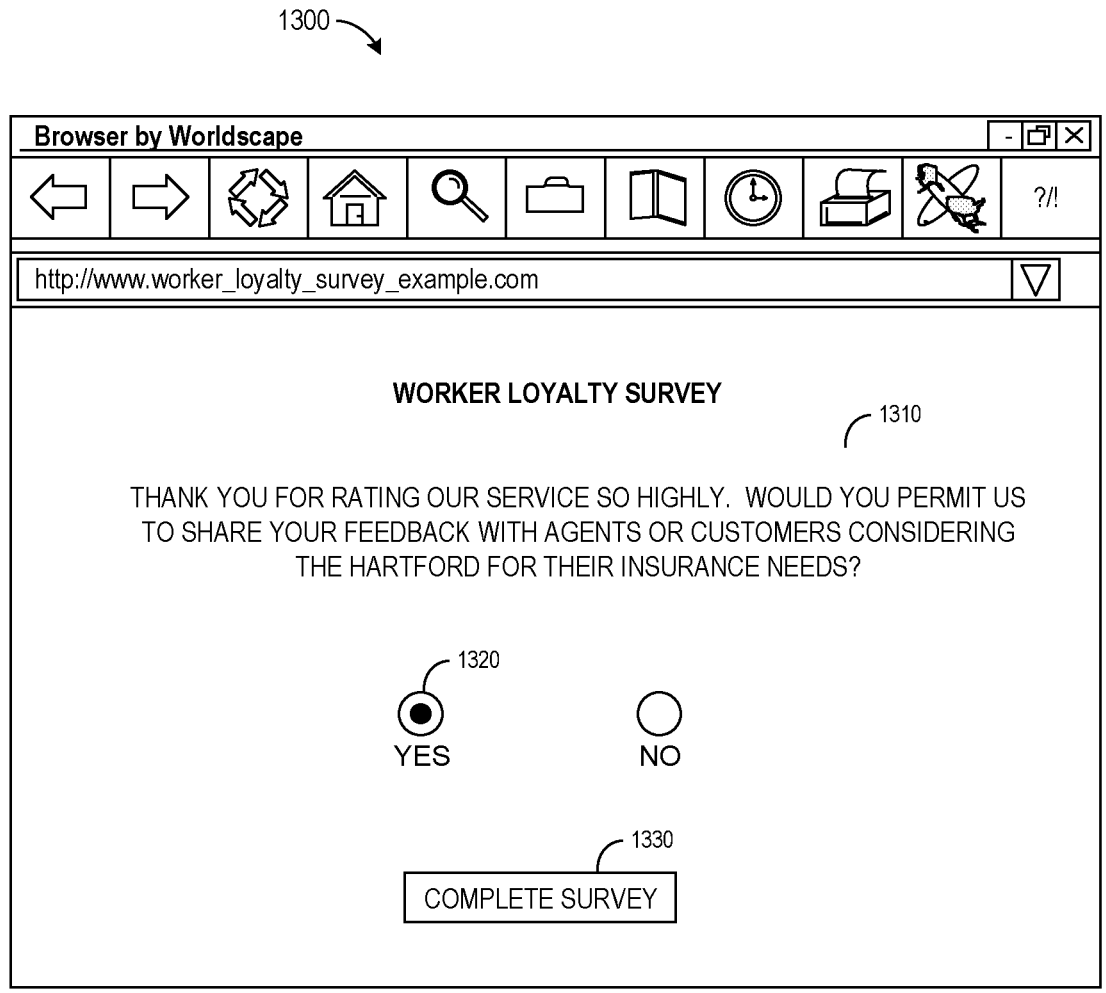
FIG. 13 is display illustrating a supplemental portion of a data source loyalty survey that might be displayed to a data source in accordance with any of the embodiments described herein.

When the portion of the claimant feedback response is classified as being in the potential-promoter category, it may be automatically arranged for the data source to respond to a supplemental portion of the loyalty survey before the survey is concluded. The supplemental portion may, for example, be a display 1300 such as the one illustrated in FIG. 13 including a question 1310 asking for the claimant's permission to include information about the claimant in a "testimonial marketing message." The claimant may respond in an input area 1320 and conclude the survey 1330. As used herein, the phrase "testimonial marketing message" might refer to, for example, a web advertisement, an email message, text information, image information, video information, audio information, and/or marketing materials (e.g., a brochure or pamphlet). Note that testimonial marketing messages may be provided to potential data sources who are unknown to the responding claimant (e.g., people other than the responding claimant's friends, family, and business acquaintances). According to some embodiments, testimonial marketing messages may be provided to potential claimants who share one or more characteristics with the responding claimant (e.g., who belong to the same organization or have filed similar types of insurance claims in the past). Moreover, according to some embodiments the testimonial marketing message may comprise audio information provided by the responding claimant that is played for or otherwise transmitted to the potential data sources.

According to some embodiments, a testimonial marketing message may include the distribution of information to members of social networking web sites. For exemplary purposes, such sites/networks may include ebay.com, Facebook.com, LinkedIn.com, AngiesList.com, Twitter.com, Blogger.com, MySpace.com, Friendster.com, and other similar sites. In such cases, a testimonial marketing message might represent a social network post (e.g., "Sandra Jones rated her insurance experience a 9 out of 10!") or a social network approval indication (e.g., a Facebook "like" indication).

An example of a database that may be used in connection with the back-end application tool or platform will now be described in detail with respect to FIG. 14. Note that the database described herein is only an example, and additional and/or different information may be stored therein. Moreover, various databases might be split or combined in accordance with any of the embodiments described herein.

Figure 14:
FIG. 14 is a tabular portion of a data acquisition database that might be provided in accordance with some embodiments.

Referring to FIG. 14, a table is shown that represents a worker database 1400 that may be stored at the back-end application tool or platform according to some embodiments. The table may include, for example, entries that may be associated with workers who have missed work due to an injury. The table may also define fields 1402, 1404, 1406, 1408, 1410 for each of the entries. The fields 1402, 1404, 1406, 1408, 1410 may, according to some embodiments, specify: a worker identifier 1402, a communication identifier 1404, an expected return to work 1406, a loyalty value 1408, and an alert status 1410. The worker database 1400 may be created and updated, for example, as information is received about a FNOL, surveys are completed, etc.

The worker identifier 1402 may be, for example, a unique alphanumeric code identifying a worker who has missed work due to an injury. The communication identifier 1404 may be, for example, a telephone number, email address, etc. that may be used to contact the worker. The expected return to work 1406 may indicate when the worker predicts that he or she will return to the workplace (e.g., as indicating during the interim survey). The loyalty value 1408 may include information from the final survey and the alert status 1410 might indicate if an alert signal was automatically transmitted to a claim handler, team leader, nurse, etc.

Figure 15:
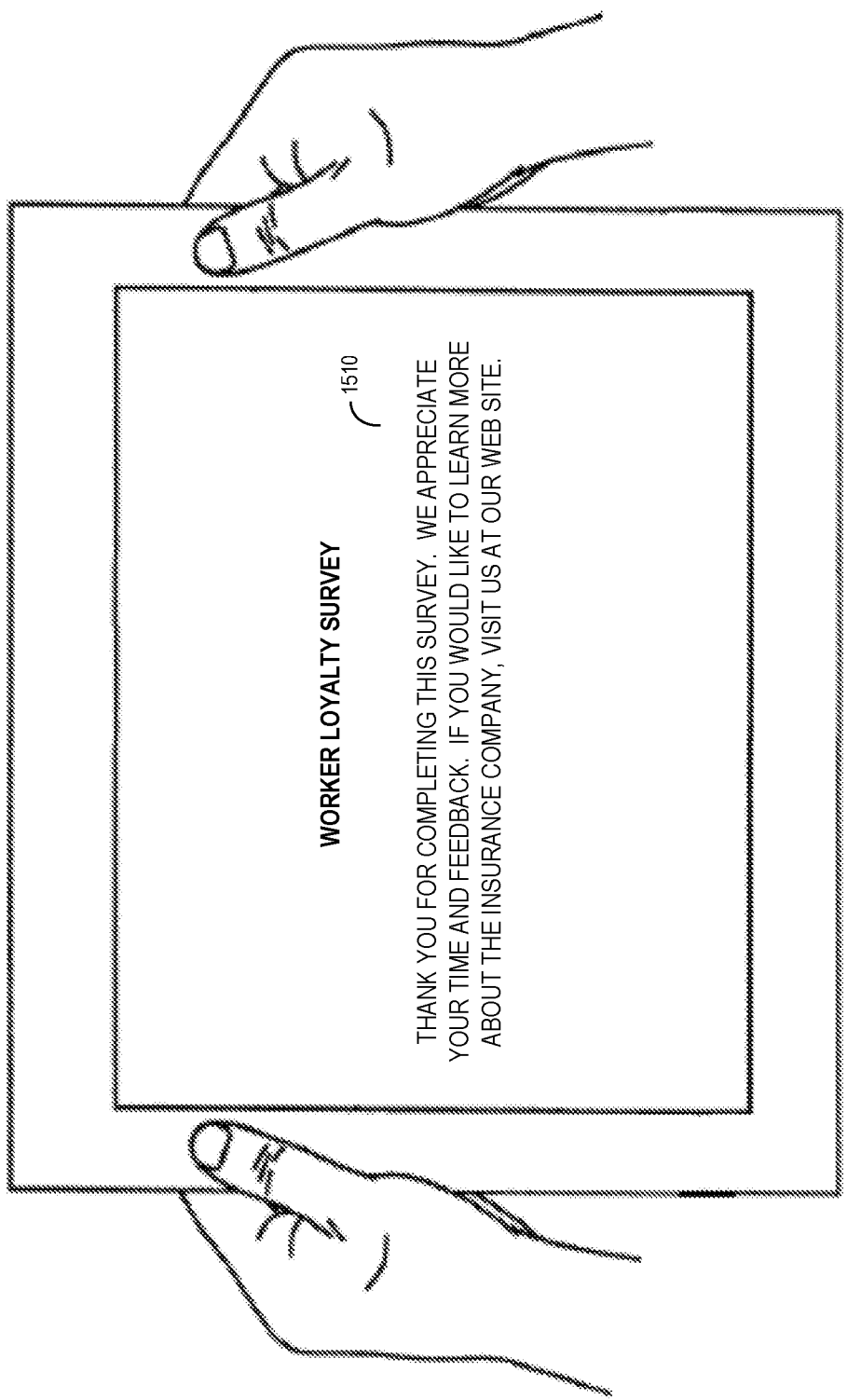
FIG. 15 is display illustrating a portion of a survey conclusion that might be displayed to a data source via a tablet computer in accordance with any of the embodiments described herein.

Although specific hardware and data configurations have been described herein, note that any number of other configurations may be provided in accordance with embodiments of the present invention (e.g., some of the information associated with the databases described herein may be combined or stored in external systems). Additionally, one or more of the elements described herein may be practiced in a distributed cloud computing environment where tasks are performed by logically or physically remote processing devices that are linked through one or more communications networks. For example, FIG. 15 illustrates a handheld tablet 1500 "thank you" display according to some embodiments described herein. In particular, the handheld tablet 1500 is displaying a "thank you" message 1510 that might be transmitted to a claimant who has provided survey responses to any of the systems described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to improve data exchange over a distributed communications network, comprising:
   (a) a data acquisition computer programmed to:
      (i) receive, from a back-end application server, a first task request including a data source communication identifier,
      (ii) responsive to the first task request, perform a first data acquisition process in accordance with the data source communication identifier, the first data acquisition process including indications of: a quality of service received by the data source from a service provider and a quality of service performed by the back-end application server, and
      (iii) transmit at least one electronic file containing information about the first data acquisition process, including the indications;
   (b) a data acquisition database to store information contained within the electronic files; and
   (c) the back-end application server, remote from and in communication with the data acquisition computer and the data acquisition database via the distributed communication network, programmed to:
      (iv) generate and transmit the first task request to the data acquisition computer, said generation and transmitting being triggered a first pre-determined period of time after an event associated with the data source,
      (v) detect that a second pre-determined period of time after the event has occurred, the second pre-determined period of time being greater than the first pre-determined period of time, and
      (vi) responsive to the detection that the second pre-determined period of time has occurred, facilitate a second data acquisition process including at least one rating within a scale of ratings provided by the data source after the second pre-determined period of time.

2. The system of claim 1, wherein the data acquisition computer is further programmed to automatically transmit an alert signal to the back-end application server in substantially real time based on the quality of service received by the data source from the service provider or the quality of service performed by the back-end application server.

3. The system of claim 2, wherein the data acquisition computer is further programmed to automatically transmit a batch of electronic files to the back-end application server on a periodic basis.

4. The system of claim 1, wherein the back-end application server is further programmed to determine if an exception condition prevents the first task request from being transmitted to the data acquisition computer.

5. A computer-implemented method to improve data exchange via a distributed communication network, comprising:
   receiving, at a data acquisition computer from a back-end application server, a first task request including a data source communication identifier;
   responsive to the first task request, performing, by the data acquisition computer, a first data acquisition process in accordance with the data source communication identifier, the first data acquisition process including indications of: a quality of service received by the data source from a service provider and a quality of service performed by the back-end application server;
   transmitting at least one electronic file containing information about the first data acquisition process, including the indications, to a data acquisition database;
   generating and transmitting, by the back-end application server, the task request to the data acquisition computer, said generation and transmitting being triggered a first pre-determined period of time after an event associated with the data source;
   detecting, by the back-end application server, that a second pre-determined period of time after the event has occurred, the second pre-determined period of time being greater than the first pre-determined period of time; and
   responsive to the detection that the second pre-determined period of time has occurred, facilitating, by the back-end application server, a second data acquisition process including at least one rating within a scale of ratings provided by the data source after the second pre-determined period of time.

6. The method of claim 5, wherein the data acquisition computer is further to automatically transmit an alert signal to the back-end application server in substantially real time based on the quality of service received by the data source from a service provider or the quality of service performed by the back-end application server.

7. The method of claim 6, wherein the data acquisition computer is further to automatically transmit a batch of electronic files to the back-end application server on a periodic basis.

8. The method of claim 5, wherein the back-end application server further determines if an exception condition prevents the first task request from being transmitted to the data acquisition computer.

9. A system to improve data exchange over a distributed communications network, comprising:
   (a) a survey terminal computer programmed to:
      (i) receive, from a back-end application server, a first survey request including a worker communication identifier,
      (ii) responsive to the first survey request, perform a first survey in accordance with the worker communication identifier, the first survey including indications of: a quality of service received by the worker from a health care provider and a quality of service performed by the back-end application server, and
      (iii) transmit at least one electronic file containing survey results, including the indications;
   (b) a survey results database to store information contained within the electronic files; and
   (c) the back-end application server, remote from and in communication with the survey terminal computer and the survey results database via the distributed communication network, programmed to:
      (iv) generate and transmit the first survey request to the data acquisition computer, said generation and transmitting being triggered a first number of days after a first notice of loss associated with the worker,
      (v) detect that a second number of days after the first notice of loss has occurred, the second number of days being greater than the first number of days, and
      (vi) responsive to the detection that the second number of days has occurred, facilitate a second survey including at least one satisfaction rating provided by the worker after the second number of days.

10. The system of claim 9, wherein the survey terminal computer is further programmed to automatically transmit an alert signal to the back-end application server in substantially real time based on the quality of service received by the worker from a health care provider or the quality of service performed by the back-end application server, and further wherein the worker is associated with at least one of: (i) a workers' compensation insurance claim, and (ii) a group benefits insurance claim.

11. The system of claim 10, further comprising:
a voice recording device in communication with the survey terminal computer for storing a worker voice recording, wherein the worker voice recording is included in the alert signal.

12. The system of claim 10, wherein the survey terminal computer is further programmed to automatically transmit a batch of electronic files to the back-end application server on a periodic basis.

13. The system of claim 9, wherein the back-end application server is further programmed to determine if an exception condition prevents the first survey request from being transmitted to the survey terminal computer.

14. The system of claim 13, wherein the exception condition is associated with at least one of: (i) a death, (ii) a dismemberment, (iii) an amputation, (iv) Hepatitis, (v) AIDS, (vi) silica or asbestos, (vii) an injury from a needle, (viii) an assault, (ix) a mental health issue, (x) terrorism, (xi) an unreserved claim, (xii) a claim where the claimant is the insured, (xiii) a claimant represented by an attorney, (xiv) claims involved in a litigation, (xv) a denied claim, and (xvi) a claim closed without a payment.

15. The system of claim 9, wherein a loyalty rating for the worker is determined by assigning a worker loyalty value to worker feedback response, wherein the worker is classified as being in a potential-detractor category when the worker loyalty value is below first threshold value and the worker is classified as being in a potential-promoter category when the data source loyalty value is above pre-determined threshold value.

16. The system of claim 15, wherein a worker loyalty index is calculated for a plurality of workers, the worker loyalty index being based on an overall amount of workers in the potential-promoter category reduced by an overall amount of workers in the potential-detractor category.

17. The system of claim 9, wherein information associated with a worker includes at least one of: (i) a worker name, (ii) a worker score, (iii) a worker comment, (iv) a worker agent, (v) social network information about the worker, (vi) a claim identifier, (vii) a claim status, (viii) worker loyalty index data, and (ix) when the worker expects to return to a workplace.

18. The system of claim 9, wherein the worker provides information via at least one of: (i) a telephone call, (ii) a web survey, and (iii) an email survey.

19. The system of claim 9, wherein the first survey further includes questions associated with at least one of: (i) a satisfaction level associated with claim handling, (ii) a satisfaction level associated with medical treatment, (iii) a satisfaction level associated with appointment scheduling, (iv) whether or not it is difficult to reach a claims handler, (v) whether or not there are questions about wage benefits, and (vi) an overall satisfaction score.

20. The system of claim 9, wherein the first pre-determined number of days is approximately eighteen days, and the system is further adapted to perform at least one of: (i) a medical survey, and (ii) a nurse review.

* * * * *